INVENTOR

BY William D. Stokes
ATTORNEY

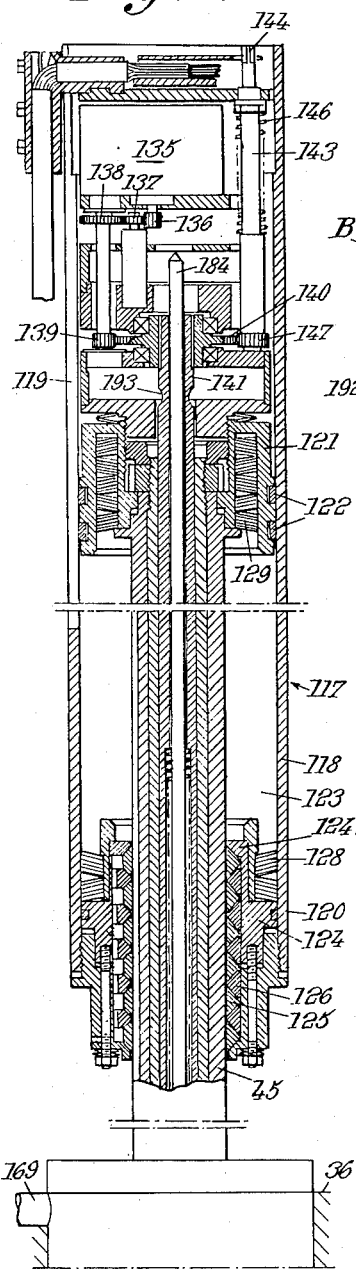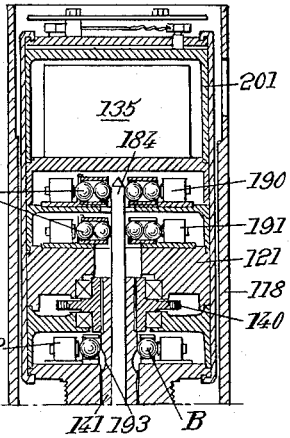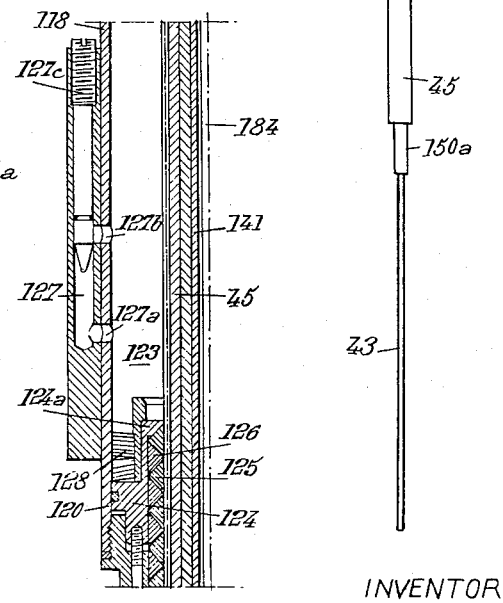

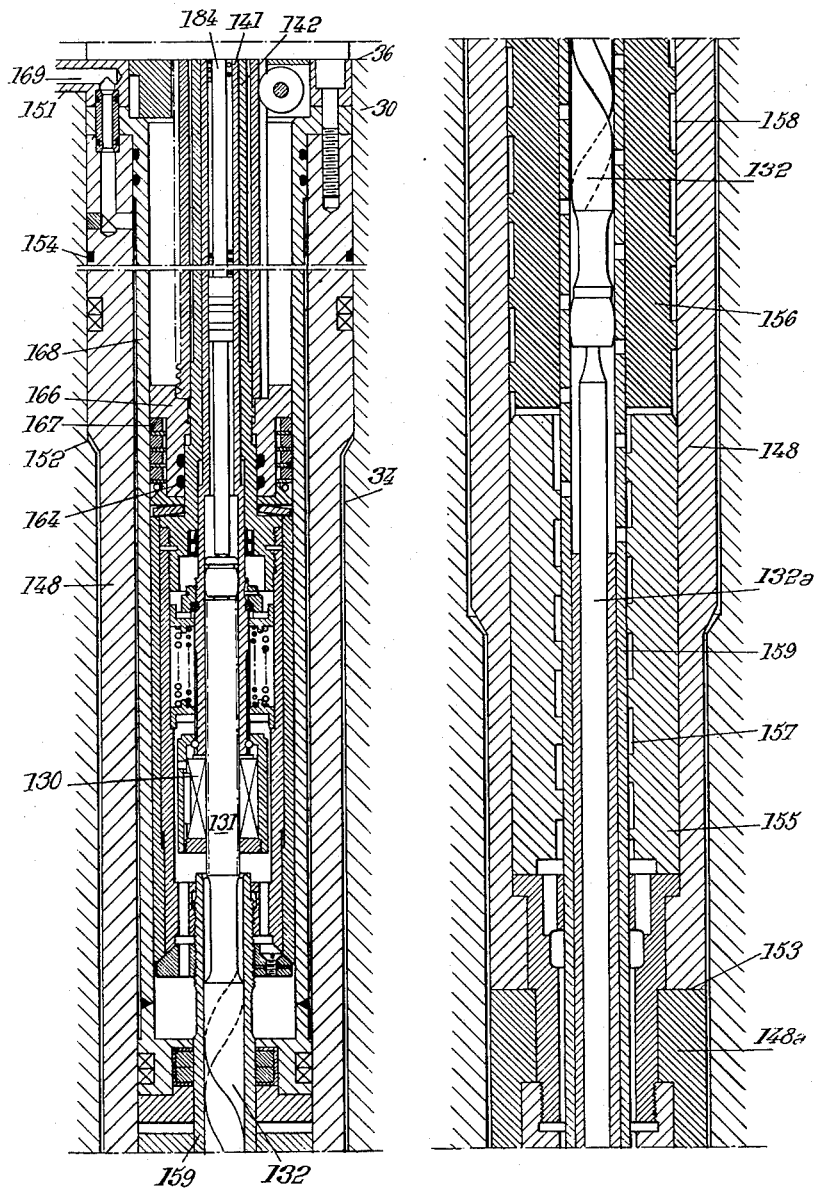

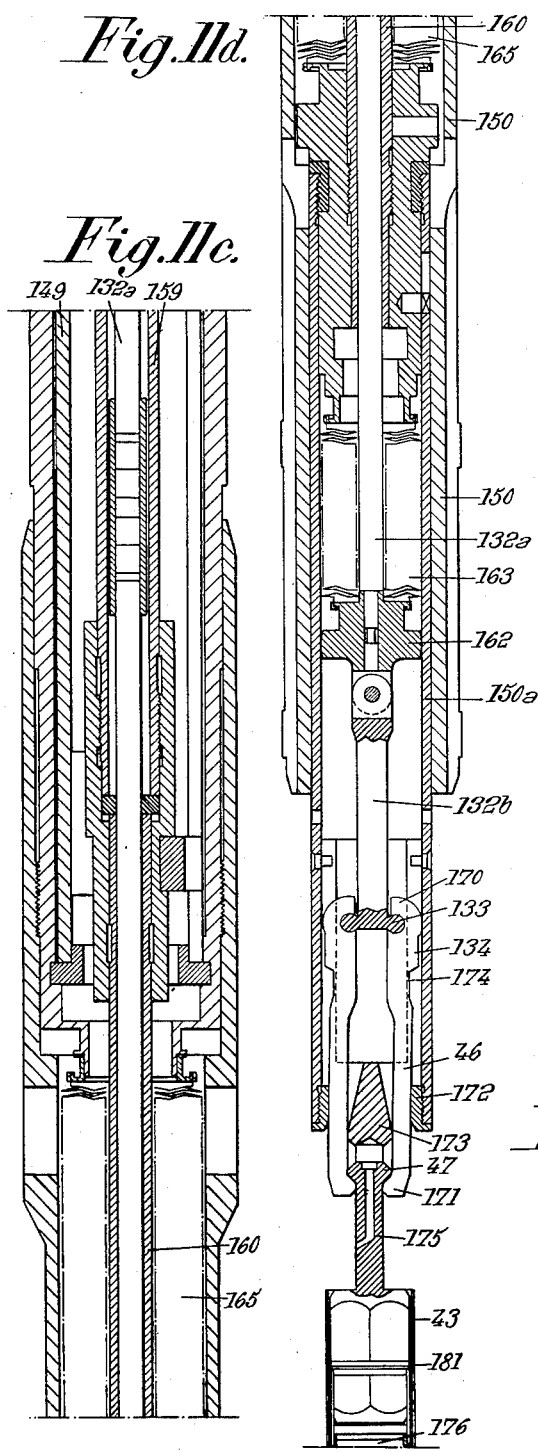

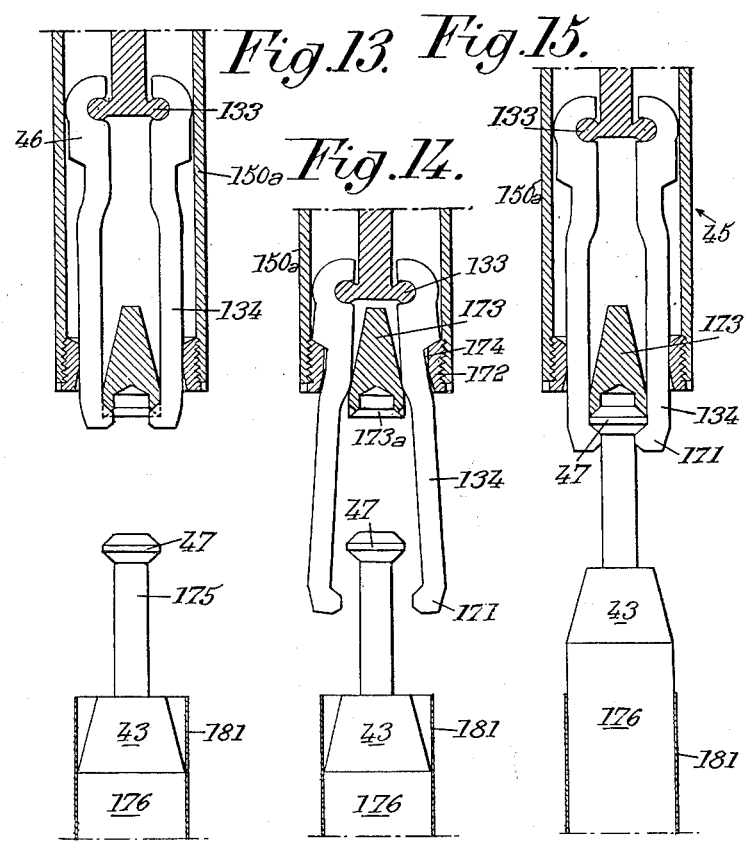

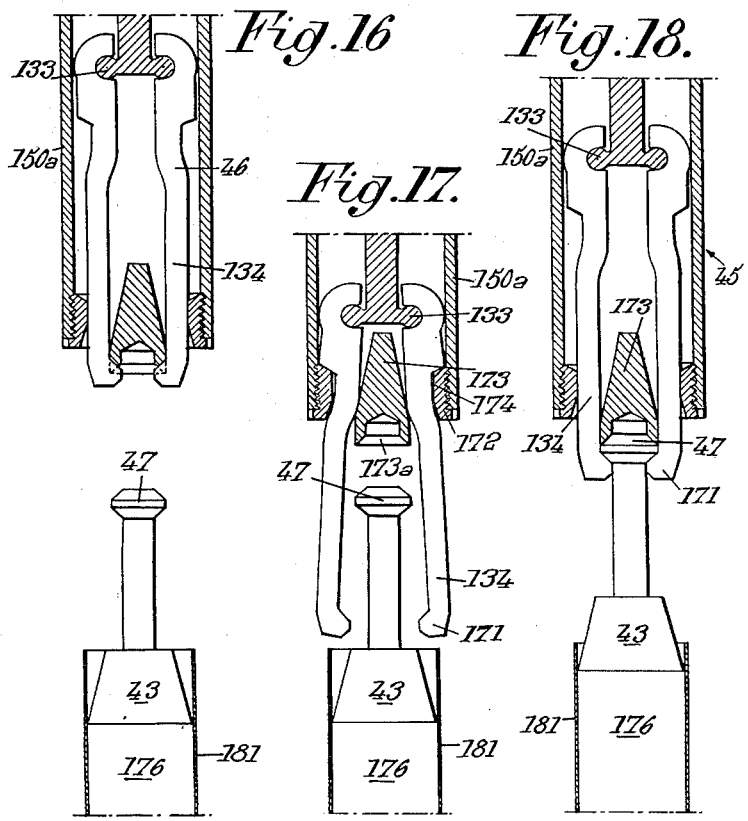

United States Patent Office 3,139,384
Patented June 30, 1964

1

3,139,384
NUCLEAR REACTOR CONTROL ROD OPERATING
DEVICE
Etienne Filloleau, Clichy, Marcel Haffemayer, Asnieres,
and Jean Maulard, Ivry-sur-Seine, France, assignors to
Commissariat a l'Energie Atomique, Paris, France, an
organization of France
Filed June 22, 1962, Ser. No. 204,376
Claims priority, application France June 27, 1961
8 Claims. (Cl. 176—36)

The present invention relates to devices for operating control rods, in particular in a nuclear reactor cooled by circulation of a molten metal, for instance liquid sodium.

The chief object of our invention is to provide an operating device which is better adapted to meet the requirements of practice than those known up to this time, especially concerning, on the one hand, automaticity and reliability of operation (even in the absence of a conventional lubricant, which cannot be accepted in a nuclear reactor) so as to ensure both regulation and safety, and, on the other hand, reduced overall dimensions and easy access to the operating mechanism.

According to an essential feature of our invention, the device for operating the nuclear reactor control rod (which, according to the case, may be a shim rod, a regulating rod and/or a safety rod) comprises, in combination, a control differential gear having an output element which produces the displacements of the control rod, a first input element adapted to be rotated in both directions, preferably at different respective speeds, by a power unit, and a second input element adapted to be rotated in the direction that moves the control toward its safety position by an actuating system, preferably of the spring type.

A preferred embodiment of our invention will be hereinafter described wtih reference to the appended drawings, given merely by way of example, and in which.

Figure 3:
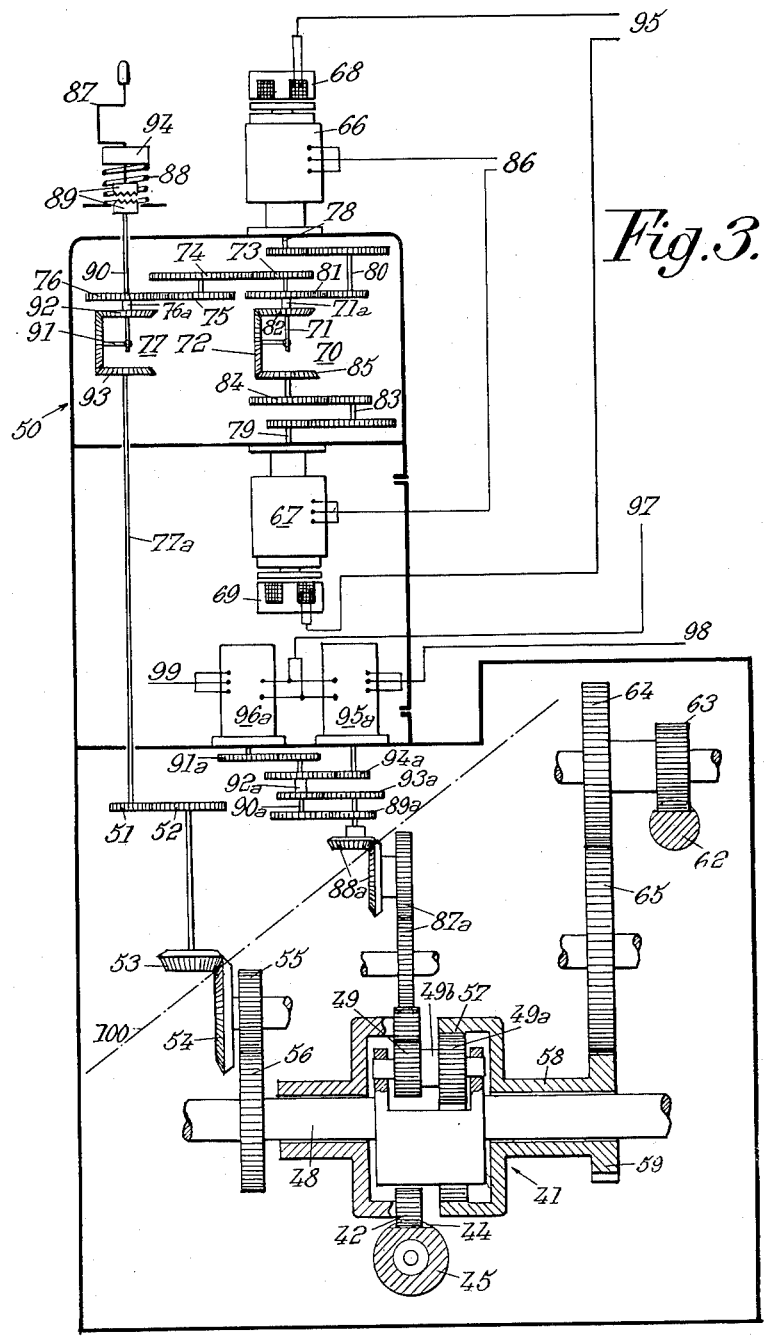
Figure 4:
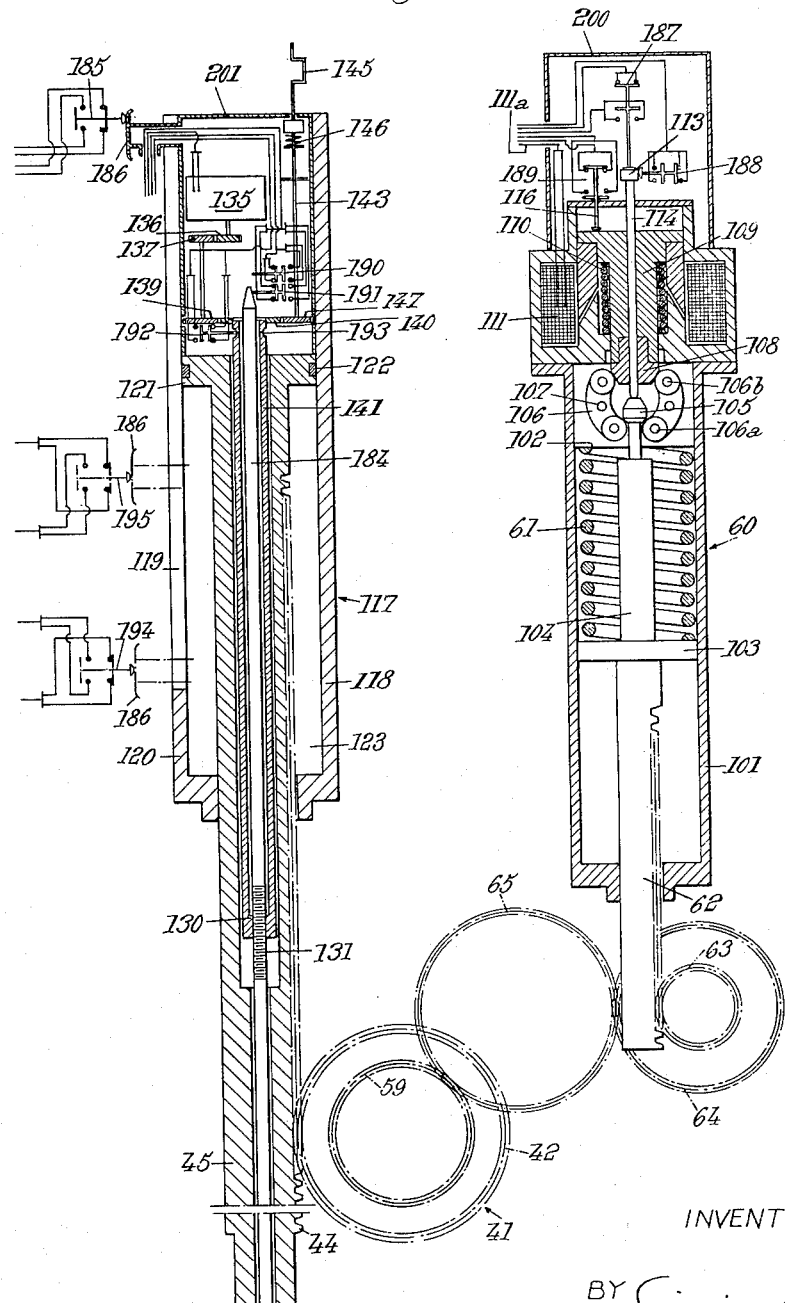
Figure 5:
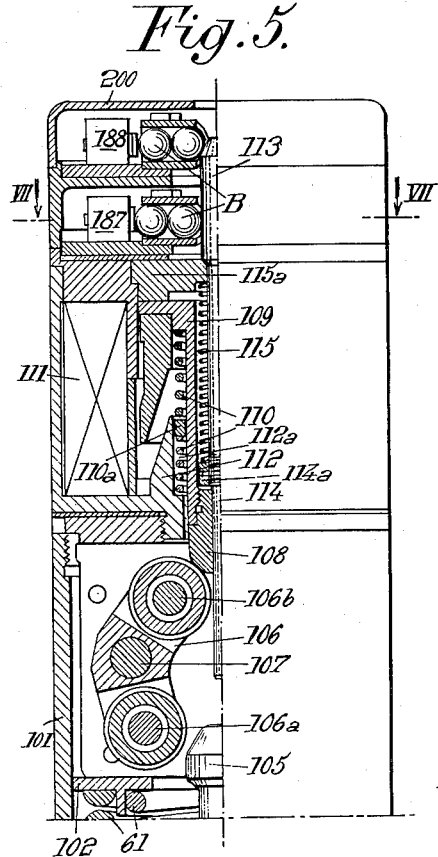
Figure 6:
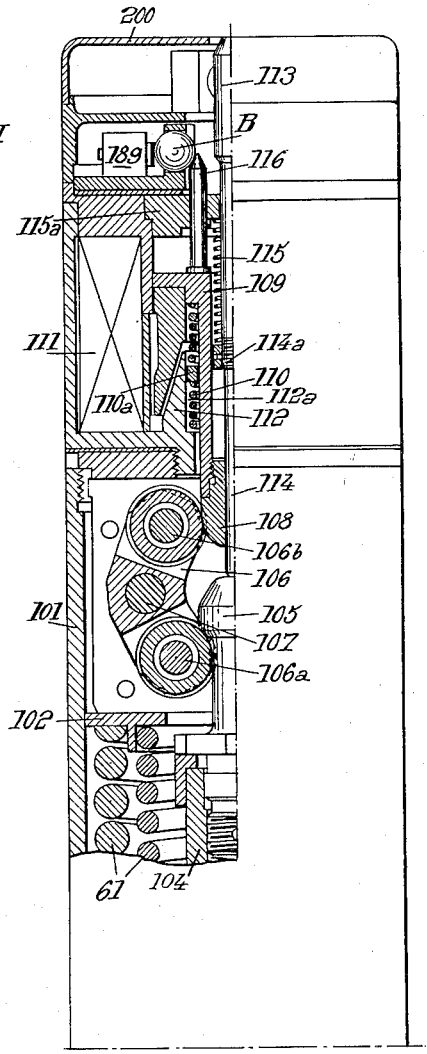
Figure 7:
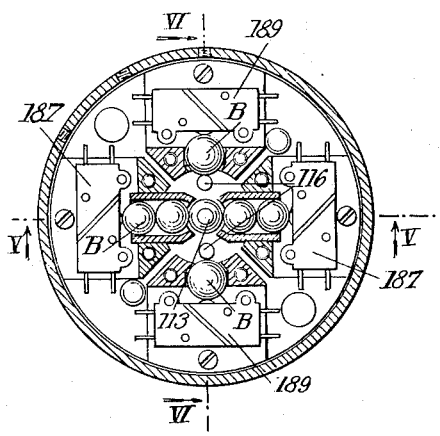

FIG. 3 diagrammatically shows the differential gear for driving said operating device;

FIG. 4 is a diagrammatic longitudinal section of the actuating system acting on the differential gear of FIG. 3, and the shock absorbing system cooperating therewith;

FIGS. 5 and 6 are two longitudinal sections, in two respective planes perpendicular to each other, of the upper portion of the actuating system of FIG. 4, in two different positions respectively;

FIG. 7 is a section on the line VII—VII of FIG. 5, FIGS. 5 and 6 being sections of FIG. 7 respectively on the lines V—V and VI—VI;

FIG. 9 is a section, in a plane perpendicular to that of FIG. 8, of the upper portion of the shock absorbing system of FIG. 4;

FIG. 10 is a section, in a plane oblique to the section plane of FIG. 8, of the lower portion of the shock absorbing system;

FIG. 11 diagrammatically shows, in elevation, the whole of a control rod;

FIGS. 11a, 11b, 11c, 11d and 11e are longitudinal

2 sections, on an enlarged scale, of successive portions of the control rod of FIG. 11, from the top to the bottom;

FIG. 12 is a cross-section on the line XII—XII of FIG. 11e.

FIGS. 13–15 illustrate three positions of the lower end of the operating bar and of the upper end of the control rod when the nuclear reactor is cold;

FIGS. 16–18 illustrate three different positions of the lower end of the operating bar and of the upper end of the control rod when the nuclear reactor is hot.

*Brief Description of a Nuclear Reactor Provided With a Control Rod Operating Device According to the Invention*

It will be supposed that the device according to our invention is to be used in a nuclear reactor of the converter type, i.e. a nuclear reactor which consumes a first kind of fuel (consisting of a fissionable product, such as plutonium-239 and/or uranium-235, contained in fuel elements of uranium enriched in $U^{235}$) and simultaneously produces a second kind of fuel (for instance plutonium from a fertile product consisting of uranium-238 contained in a reflector or blanket of natural uranium of uranium depleted in $U^{235}$). More particularly the reactor that is considered is a breeder, i.e. a reactor which produces more fissionable atoms (plutonium atoms) than it consumes (uranium-235 atoms), this reactor being of the fast neutron type (neutrons having energies ranging from about 20 kev. to 10 mev., for instance from 100 kev. to 1 mev.) and it is cooled by a molten metal (such as liquid sodium).

Figure 1:
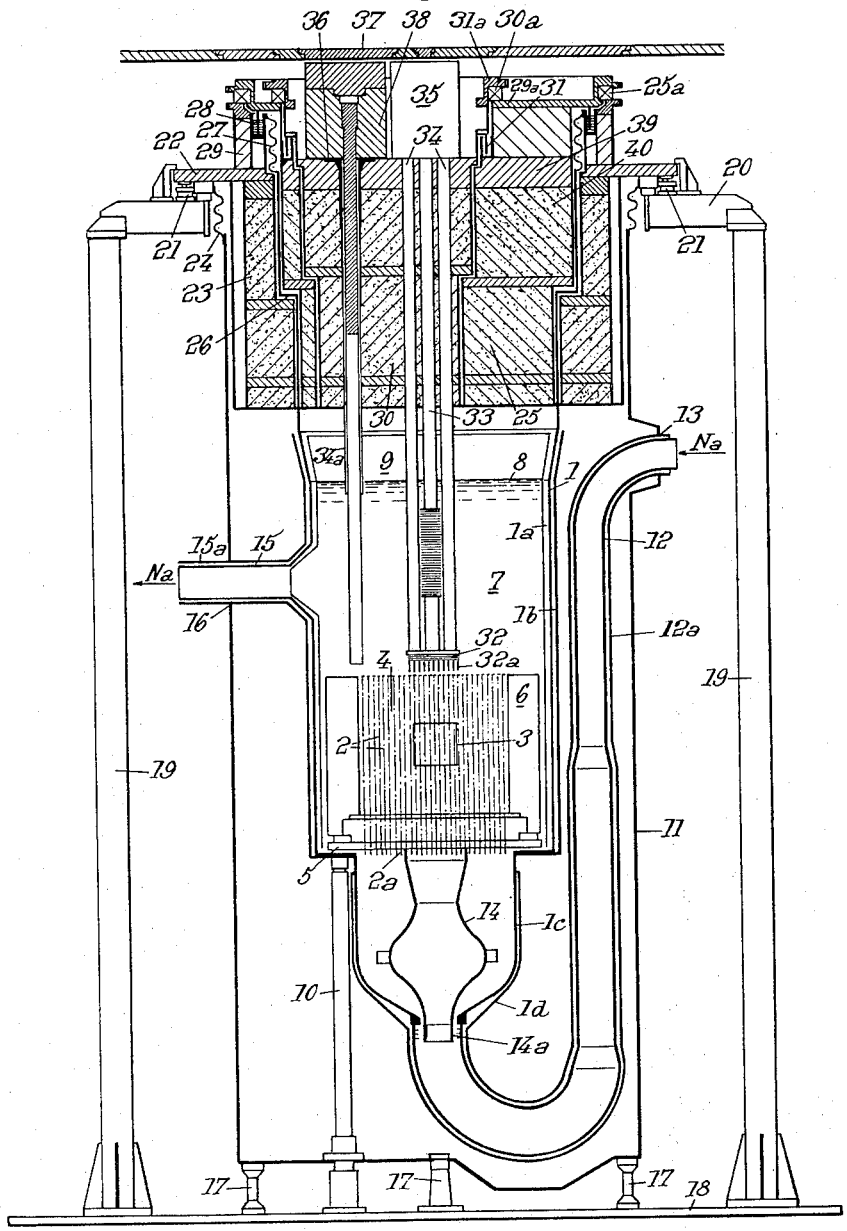
FIG. 1 is a diagrammatic section of a fast neutron converter reactor, comprising a core of fissionable material surrounded by a reflector of fertile material, this reactor being provided with a control rod operating device according to the invention.

A reactor of this type is diagrammatically illustrated by FIG. 1 and it comprises a tank 1 in which is housed a cylindrical set of acicular fuel assemblies containing uranium and/or plutonium, this set comprising a core 3 of a highly fissionable material (uranium enriched in $U^{235}$ and/or plutonium) and a blanket 4 of fertile material (natural uranium or uranium depleted in $U^{235}$). This set of assemblies 2, supported by a plate 5, is surrounded laterally by a neutron shield 6 and is immersed in a bath 7 of liquid sodium, the top level of which (slightly variable during operation) is visible at 8. Above this level, there is an atmosphere 9 of argon with a slight overpressure. As a matter of fact it is necessary to prevent any contact between liqiud sodium and an oxidizing gas, such as air, which would produce combustion of sodium. Heat insulating means 1a ensure thermal insulation of this bath 7 against heat from the outside, whereas melting of this bath is ensured, when the reactor is started, by circulation of a fluid such as nitrogen in a preheating envelope 1b which surrounds tank 1.

Tank 1 is mounted on support 10, for instance in the form of jacks, inside a safety vessel 11 intended to collect molten metal and fissionable and fertile products in case of breaking of tank 1 and of the assemblies 2.

The liquid sodium intended to cool down core 3 and blanket 4 without appreciable slowing down or capture of the first neutrons arrives through pipe 12, which passes at 13 through the wall of safety vessel 11 and this sodium is divided by an annular diaphragm 14a into two flows, one of which, under a higher pressure, passes inside vessel 14, whereas the other one passes between this vessel and the lower portion 1c of tank 1. Both of these flows arrive under plate 5, penetrate into assemblies 2 through nozzles 2a for cooling core 3 and blanket 4 and thence flow out to heat exchangers (not shown) through pipe 15, which passes at 16 through the wall of vessel 11. Preheating jackets 12a, 15a, 1d surround pipes 12 and 15 and the lower part 1c of tank 1.

Safety vessel 11 is supported through jacks 17 on a foundation, the top area of which is shown at 18. This area 18 also carries uprights 19 which support an annular part 20 on which is mounted, through jacks 21, a plate 22 in which is secured a fixed annular plug 23. A bellows seal 24, disposed between plate 22 and the upper periphery of safety vessel 11, forms a gastight separation between the inside of this vessel 11 and the external atmosphere.

An annular rotating plug 25 is rotatably mounted in fixed annular plug 23, with a ball bearing 25a interposed between a circular support 29 carried by plate 22 and a flange 29a supporting plug 25. The wall of tank 1 is extended as shown at 26 to pass between annular plugs 23 and 25. A metallic bellows seal 27 and a liquefiable joint 28 (carried by circular support 29) prevent sodium and argon vapours from leaking to the outside of tank 1.

A small rotatable plug 30 is adapted to rotate in the annular rotating plug 25 owing to a ball bearing 30a mounted between flange 29a and a flange 31a which supports plug 30, a seal being provided at 31.

This small plug 30, the axis of rotation of which is offset with respect to the axis of rotation of the big rotating plug 25 permits the following operations:

Loading and unloading of fuel assemblies 2 through a channel 34a, since, by rotation of the two plugs 25 and 30, this channel can be brought into line with any of these assemblies 2;

Control of cover 32, which applies assemblies 2 against plate 5, and which carries thermocouples 32a for measuring the temperature, this control being effected by means of an arm 33; and Operation of the control rods through channels 34 by means of a mechanism housed in a cover 35 disposed between the top surface 36 of rotating plug 30 and the floor of the nuclear reactor, shown at 37, side by side with the shield 38 provided above channel 34a.

In order to obtain a good protection against neutrons, plugs 23–25–30 are stepped and consist of alternate layers 39 (shown by mere hatchings) of a neutron absorbing substance (such as heavy concrete) and of layers 40 (shown by hatchings and dots) of a substance (such as lithium or bismuth) capable of stopping the gamma rays which result from the absorption of neutrons by layers 39 (with the production of radioactive substances capable of emitting gamma rays) and also the non-elastic diffusion of neutrons in these layers 39.

General Arrangement of the Control Rod Operating Device

Concerning the control rod operating device, it must permit of performing the following operations:

On the one hand to vary, during normal or starting operation, the reactivity of the reactor by introducing more or less into empty housings provided between the housings for assemblies 2, for instance in the region between core 3 and blanket 4, control rods each of which comprises an active portion rich in a substance having a large neutron capture cross section (such as boron and in particular boron-10 hafnium, and cadmium) so as to keep the reactivity at the desired value the rods then acting as elements for compensating the variations of reactivity during normal operation; and On the other hand to stop, in case of emergency, the reactor by introducing, generally by downward movement of the control rods, the maximum amount of their active portion into the reactor core, the rods then acting as safety rods which stop the chain fission reaction by a very important adsorption of the neutrons.

For the sake of simplicity, both in the description and in the drawings, we will deal only with a single control rod, the other control rods being similarly operated.

According to the main feature of our invention, we provide, in combination, in the device producing the displacement of every control rod, a differential gear 41, advantageously of the epicyclic type, comprising the following elements:

An output element consisting of a first ring gear 42, producing the displacement of control rod 43 (FIGS. 11, 11d, 11e, 12) through a rack 44 which meshes with gear 42 and is carried by an operating bar 45 supporting through a tong 46 the head 47 of control rod 43 (FIG. 11d);

A first input element consisting of a shaft 48 carrying a planet wheel carrier 49b (a first set of planet wheels 49 mounted on this carrier meshing with ring gear 42); this shaft may be rotated in both directions (preferably at substantially different respective speeds) by a power unit 50 (FIG. 3), through pinion pairs 51–52–53–54 and 55–56; and A second input element consisting of a ring gear 57 (meshing with a second set of planet wheels 49a also mounted on carrier 49b); this ring gear 57 is fixed on a sleeve 58 which also carries a pinion 59. This pinion 59 may be rotated in the direction for which control rod 43 is moved toward its safety position (i.e. in the downward direction) by an actuating system 60 (FIG. 4) comprising a spring 61 which is normally compressed (in FIGS. 5 and 6 we have shown two springs 61 whereas in diagrammatic FIG. 4 we have shown only one of the springs 61). The actuating device comprises a rack 62 which actuates pinion 59 through toothed wheels 63–64 and 65 (FIGS. 3 and 4).

Power Unit

Power unit 50 comprises, as shown by FIG. 3, two electric motors 66 and 67 (for instance asynchronous three-phase motors) one of which, to wit motor 66, is capable of running in both directions, each of these motors being provided with an electro-magnetic brake 68, 69 respectively, these motors cooperating with a differential 70.

Differential 70 comprises the following elements:

An output shaft 71 driven by the arm on which is journalled a central gear 72, the rotation of said output shaft 71 being transmitted, through two pairs of toothed wheels 73–74 and 75–76 (wheel 76 being mounted on a sleeve 76a) and a differential 77 (to be fully described hereinafter), to an intermediate shaft 77a on which is fixed pinion 51, which drives the first input element 48 of epicyclic differential 41, And two input shafts 78 and 79, which are the shafts of motors 66 and 67 respectively; shaft 78 drives, through a transmission gear 80, a pinion 81 fixed on a sleeve 71a (in which shaft 71 is journalled) rigid with a first side pinion 82; shaft 79 drives, through a gear transmission 83, a pinion 84 fixed on the shaft of a second side pinion 85, both of the side pinions 82 and 85 meshing with the central gear 72.

When input shafts 78 and 79 turn both in the same direction, their movements of rotation are transmitted with suitable gear ratios to the side pinions 82 and 85 of differential 70 so as to impart to the output shaft 71 and therefore to intermediate shaft 77a and to the input shaft 48 of differential 41, movements of rotation of speeds and directions capable of driving in the downward direction rack 44 and therefore control rod 43 at a medium speed (for instance equal to 1 mm./s.). On the contrary when the direction of rotation of the shaft 78 of motor 66 is reversed, differential 70 causes 71, 77a and 48 to rotate in directions and with speeds such that rack 44 and consequently control rod 43 move upwardly at a slow speed (equal for instance to 0.1 mm./s.).

In order to obviate an accidental failure of motors 66 and 67 or of the feed means thereof, consisting of three-phase conductors 86 (for instance with 220 volts and 50 cycles current) we provide an emergency manual control by means of a crank 87 capable, after having compressed a spring 88 of driving, through a clutch 89, shaft 90 (which is freely rotatable in sleeve 76a) to which is fixed an arm 91 on which is journalled the central gear of differential 77. The two side pinions of this differential 77 are 92, coupled with toothed wheels 76, and 93 fixed on intermediate shaft 77a. During normal operation by means of motors 66 and 67, arm 91 is fixed and the rotation of pinion 92 is transmitted to pinion 93 through the central gear of differential 77. On the contrary in case of breakdown of motors 66 and 67, side pinion 92 is fixed and the rotation of crank 87 (transmitted through clutch 89) causes arm 91 to turn, thus driving the second side pinion 93 and consequently intermediate shaft 77a. A torque limiter 94, connected with the crank, prevents any deterioration when the end stroke abutments (hereinafter described) of the control rods are reached during manual operation. On the contrary in the case of electric operation, contacts (hereinafter described) prevent the feed of current to motors 66 and 67 through lines 86 and/or feed current to the electro-magnetic brakes 68, 69, through lines 95.

In both cases ring gear 57 is blocked due to the fact that rack 62 is fixed in the actuating device 60 (as it will be hereinafter explained) and the rotation of shaft 48 driven through differential 77 produces rotation of ring gear 42 and therefore displacement of rack 44 either downwardly at medium speed or upwardly at slow speed.

*System for Marking the Position of the Control Rod*

The position of operating bar 45, which carries rack 44 and therefore control rod 43, is permanently indicated by means of a synchronous transmission which indicates this position in the control chamber of the nuclear reactor.

This transmission comprises the following elements (as shown in FIG. 3):

Two pairs of pinions 87a and 88a transmitting the movement of rotation of ring gear 42 to a toothed wheel 89a, A gear transmission 90a transmitting the movement of rotation of toothed wheel 89a to a toothed wheel 91a, A gear transmission 92a (mounted on a sleeve through which passes a portion of transmission 90a) transmitting the movement of rotation of a toothed wheel 93a (turning together with wheel 89a) to a toothed wheel 94a, so that said wheel 94a turns at a much greater speed than 91a (the ratio of the two speeds of rotation to each other being of course constant), Two selsyn transmitters 95a and 96a, to wit a coarse adjustment transmitter 96a driven by toothed wheel 91a and a fine adjustment transmitter 95a driven by toothed wheel 94a, these two transmitters being fed with current through single-phase lines 97 (transmitting for instance a 120 volts, 50 cycles current), Two selsyn receivers (not shown) housed in the control chamber and connected with transmitters 95a and 96a respectively through three-phase lines 98 and 99.

This synchronous transmission does not work in case of safety quick control producing the downward movement of control rod 43 by the expansion of spring 61 (of the actuating device 60 of FIG. 4) acting upon rack 62 (FIGS. 3 and 4), because this control actuates rack 44 through ring gear 57, planet-wheels 49 then constituting either fixed elements (no other control taking place) or practically fixed elements (control operation taking place but with a speed of displacement of the rod negligible as compared with the downward displacement speed in case of emergency operation).

It will be noted that FIG. 3 is a diagrammatic view, all the shafts that are shown therein being not actually located in the same plane. In particular the portion above dot and dash line 100 is an elevation view, shafts 78 and 79, the axes of selsyn transmitters 95a and 96a and shafts 77a being vertical whereas the portion below this line 100 is substantially a plan view, the axes of racks 62 and 44 being vertical.

*Actuating Device for Producing a Quick Drop of a Control Rod*

The mechanism 60 which produces this movement, illustrated by FIGS. 4, 5, 6 and 7, is contained in a cylinder 101 and comprises springs 61 (in FIG. 4 we have shown only one spring 61), normally compressed between a fixed top plate 102 and a sliding bottom plate 103 which carries on one side rack 62 and on the other side a rod 104 (surrounded by springs 61) the top end of which carries a head 105. Links 106, pivoted about fixed axes, each carry an upper roller 106b, normally held in outer position by a wedge 108 fixed on a plunger core 109 and a lower roller 106a, rollers 106a surrounding and holding, in normal operation, the head 105 of rod 104.

Plunger 109 is normally held in the position of FIGS. 4 and 6 (where it compresses a spring 110 in two portions) by an electro-magnet 111 normally fed with current through conductors 111a. On the contrary when no current is fed to electro-magnet 111, plunger 109 quickly moves upwardly under the action of spring 110 (the two portions of which are separated from each other by a guide 110a which slides, as shown by FIG. 6 in a bore 112a provided in a fixed part 112). The upward movement of core 109 causes links 106 to pivot about their respective axes 107, thus releasing head (FIG. 5). Springs 61 exert a strong downward thrust upon sliding plate 103 and rack 62, which rotates pinion 63 and ring gear 57. Said gear imparts a quick downward movement to operating bar 45, which carries rack 44, the planet-wheel forming a fixed or practically fixed element, as above explained with reference to FIG. 3.

The displacement of rack 62 is controlled (FIGS. 4, 5 and 6) by contactors 187, 188, 189 which are operated as follows:

Contactors 187 and 188 are actuated by the head 113 of a rod 114 applied against head 105 when this head is in the locked position of FIGS. 4 and 6, under the action of a spring 115 (FIGS. 5 and 6) which bears against a fixed piece 115a and urges a flange 114a of rod 114 in the downward direction, Contactor 189 is actuated by a rod 116 carried by the plunger 109 of electro-magnet 111.

These contactors are housed at the upper portion of actuating device 60 in a casing 200 (FIGS. 2, 4, 5, 6).

*Braking and Shock Absorbing System*

In order to avoid an accident, the quick downward movement of operating bar 45, which carries control rod 43, under the action of actuating device 60, is braked at the end of the movement and the shock is absorbed by a mechanism 117 diagrammatically shown in FIG. 4, and more particularly illustrated by FIGS. 8, 9 and 10. This mechanism comprises the following elements:

A vertical cylinder 118 of treated steel (for instance sulfinized or nitrided) provided at its upper part with a longitudinal slot 119 and fixed at its lower part 120 to the main casing of the power mechanism (FIGS. 4 and 8);

A piston 121, made of a copper alloy (such as a copper aluminium alloy) fixed to the upper end of operating bar 45 and slidably mounted in cylinder 118, the gastight adjustment of piston 121 in cylinder 118 being obtained by packing rings 122 of sintered bronze impregnated with a solid lubricant (such as molybdenum bisulfide or polytetrafluorethylene);

A chamber 123 of variable volume containing a gas (such as argon) imprisoned in the lower portion (which is not slit) of cylinder 118 and compressed when piston 121 is nearing the end of its downward stroke; this gas cushion therefore produces a first slowing down of the movement of the control rod;

A second piston 124, visible only in FIGS. 8 and 10, mounted in cylinder 118 in the same manner as piston 121, this piston 124 being moved downwardly at the end of the downward stroke of the control rod by the pressure of the gas enclosed in chamber 123;

A plurality of biconical rings 125 and 126 compressed by an inner flange 124a of piston 124 moving downwardly; the external rings 126 (for instance made of rectified cementitious steel) slide and actuate the inner rings 125 (made for instance of sintered bronze impregnated with molybdenum bisulfide or polytetrafluorethylene; said rings cut into four segments (along a broken line for gastightness purposes) surround bar 45 to increase the braking of this bar and to damp the oscillations thereof at the end of its downward stroke;

Three adjustment by-passes, one of which is visible at 127 in FIG. 10, permit, just at the end of the stroke of piston 121, a return flow of the gas compressed in chamber 123 through orifices 127a and 127b under control of needle valve 127c; two of these by-passes may be accessible when the whole of the system is fixed in position on the nuclear reactor;

Finally shock absorbing rings 128 (disposed between the lower part 120 of cylinder 118 and a piston 121) and 129 (carried by piston 121), of the "Belleville washer" type, ensure a last absorption of the shock at the end of the movement 121.

Adjustment of the shock absorbing system by means of by-passes 127 may be effected in such manner that, at the end of the drop of the control rod, a nearly complete stopping of piston 121 takes place at about from 2 to 4 cms. above the bottom of cylinder 118 and that, after this, the end of the movement of piston 121 takes place very slowly until the abutment rings 128 and 129 come into contact.

*Control Means for the Tong Carried by the Operating Bar and Holding the Control Rod*

Said means are housed in the cylinder 118 of shock absorbing system 117 and move together with operating bar 45 and piston 121. Such means comprise the following elements (FIGS. 4, 8, 9 and 11a to 11d):

A screw and nut system transforming the movement of rotation of a nut 130 into a translatory movement of a screw 131 (FIGS. 4 and 11a);

A rod made of several portions 132, 132a, 132b, the upper end of which carries a screw 131 and the lower end of which carries a head 133 upon which are pivotally mounted the branches or legs 134 of tong 46 which holds the head 47 of control rod 43 (FIGS. 11a, 11d);

A system for rotating nut 130 comprising (FIGS. 4, 8 and 9) a motor 135 with a pinion 136 on its driving shaft, a speed reducing gear constituted by pinions 137, 138 and 139 and a toothed wheel 140 mounted to slide on a splined sleeve 141 surrounded by a sleeve 142 (FIG. 11a) and carrying nut 130;

An emergency manual system for rotating sleeve 141 comprising a control shaft 143 having a head 144 adapted to receive a removable crank 145, a braking spring 146 disposed about shaft 143 to prevent any possible reversibility of the screw and nut system, and a pinion 147 fixed on shaft 143 and meshing with toothed wheel 140 (FIGS. 4 and 8);

Contactors 190 and 191 actuated by a rod 184 and moving together with screw 131, and a contactor 192 actuated by a notch 193 in sleeve 141, these contactors being housed at the upper part of piston 121 in casing 201, operation of these contactors 190, 191, 192, taking place through the intermediate of balls B.

*Connecting Means Between the Control Rod and the Servo-Mechanism*

The servo-mechanism to produce regulation or starting (from power unit 50 or from crank 87) and/or to ensure safety (from actuating device 60) finally acts upon rack 44 carried by operating bar 45, whereas the device for controlling the displacement of tong 46 produces rotation of sleeves 141 (FIG. 8) and therefore, through screw 131 and nut 130, the translatory displacement of rod 132, under the effect of the rotation either of the shaft of motor 135 or of crank 145 (FIG. 4).

Figure 2:
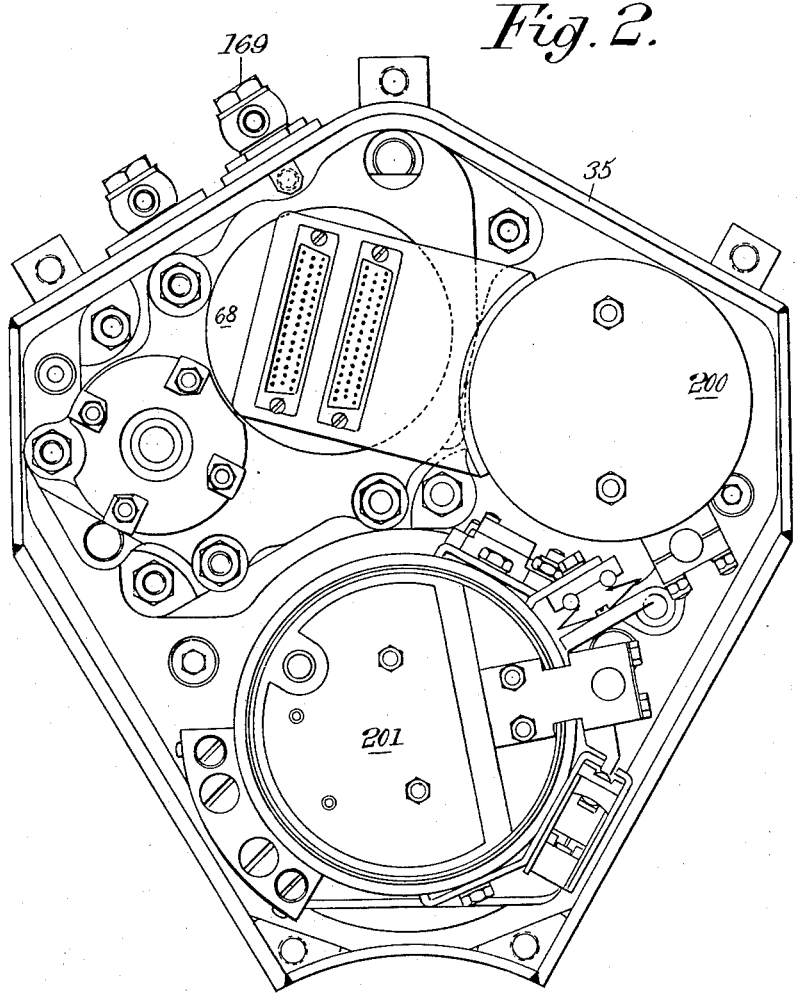
FIG. 2 is a plan view (seen from above) of the control rod operating device of FIG. 1.

Operating bar 45 and sleeve 141 are connected to the control rod through a system which essentially comprises (FIGS. 11a, 11b, 11c, 11d):

A sheath consisting of several tubes 148, 148a, 149, 150 assembled end to end and supported by a member 151 which bears against the upper face 36 of the small rotating plug 30 (FIG. 1) this sheath being fitted at its upper part in this plug 30 (for instance over 500 mm. from face 36) as far as level 152 (FIG. 11a) and being adapted to be separated into two portions at level 153, located for instance at a distance of 2800 mm. under floor 37 (i.e. at a distance of 1700 mm. under face 36); in case of necessity the upper portion 148 may be recuperated, whereas portions 148a, 149, 150 which have been made strongly radioactive by their presence in the active portion of the reactor cannot be recuperated;

A sealing device between the sheath and the small rotating plug 30, consisting of several toroidal joints (the upper joint being shown at 154 in FIG. 11a) made of synthetic rubber of the "Perbunan type," lubricated by means of silicones;

A set of tubular elements piled upon one another such as elements 155, 156 of FIG. 11b, made of stainless steel containing 18% of chrome and 8% of nickel, these elements being provided with a helical groove disposed alternatively on the inside (as the groove 157 of tube 155), and on the outside (as the groove 158 of tube 156) to ensure an efficient protection against nuclear radiation while giving a passage of sufficient cross section for argon (constituting an inert protection for liquid sodium) displaced by the quick drop of operating bar 45 which carries control rod 43;

A movable system comprising a rigid tube 159, 160 (FIGS. 11a, 11b, 11c, 11d) and a rod 132, 132a for controlling the tong mounted to slide in tube 159, 160, this rod being provided at its end with a guiding piece 162 which slides in a tube 150a housed at the upper portion of sheath 150 and which carries an extension 132b of rod 132a terminated by head 133 on which are pivoted the branches 134 of tong 46; gastightness between guiding piece 162 and movable system 159, 160 is ensured at the lower part by means of a metallic bellows 163 (FIG. 11d) and at the upper part by rings 164 (FIG. 11a) made of a synthetic rubber, for instance Perbunan lubricated with silicones;

A sealing device between the movable system and the sheath which comprises at the lower part a metallic bellows 165 (FIGS. 11c and 11d) permanently dipping in the liquid sodium and, at the upper part, a piston 166 (FIG. 11a) carrying four segments 167 of reinforced graphite (or a braid of asbestos and aluminium impregnated with graphite) and sliding in a sleeve 168 fixed on the inside of tube 148, an absolute pressure of argon of 1.2 kg./cm.$^2$ being maintained between these two joints 164, 165, which permits of detecting any burst of a metallic bellows by the increase of the argon flow-rate measured by a suitable apparatus disposed in feed pump 169 (FIG. 2);

Finally a tong 46 (FIG. 11d) which comprises several branches 134 provided, at their upper ends, with hooks 170 adapted to pivot about the head 133 of rod 132 and, at their lower ends, with hooks 171. These hooks surround the head 47 of control rod 43 and are normally kept in holding position by a guiding ring 172, screwed in the lower end of tube 150a and by a central core 173; furthermore, branches 134 each comprise a notch 174 of a profile analogous to that of guiding ring 172 so as to permit, when the branches come during their downward movement, into the position where notches 174 are located opposite ring 172, a pivoting of the branches and consequently the release of head 47.

Control Rod

Control rod 43 (FIGS. 11d, 11e and 12) comprises:

A rod 175 provided at its upper end with a head 47;

A body 176 containing a hollow active cylinder 177 made of a substance rich in boron (for instance of natural boron carbide for the shim rods and of the carbide of boron-10 for the regulating and safety rods), said cylinder being of a height slightly greater than that of the core 3 of the reactor (for instance a height of 450 mm. for a core having a height of 400 mm.), and A tubular foot 178 which is slidably mounted in a guiding tube 179, provided with an extension 181 and housed in a sheath 180 carried by plate 5.

In its position shown by FIG. 11e, control rod 43 is in its lower limit position, the conical connection 182 between embodiment 176 and foot 178 bearing on a conical housing 183 provided in guiding tube 179.

Control Contactors

In view of the fact that the elements of the device producing the displacement of the control rods is out of reach and cannot be observed directly, we provide, in addition with the selsyn system, a system of relays (controlled by contactors) preventing any mistake and indicating that the control rod has arrived at the upper or at the lower end of its movement. The relay system also permits of checking the resetting of springs 61, and the present state of tong 46, i.e. tong closed but not surrounding head 47 (FIGS. 13 and 16), tong open (FIGS. 14 and 17) or tong closed on head 47 (FIGS. 15 and 18).

In order to operate the signalling and/or checking circuits we have provided double-throw switches 187, 188, 189 housed at the upper part of the actuating device 60, double-throw switches 190, 191, 192 housed at the upper part of the shock absorbing device 117, and also external double-throw switches 185, 194, 195 (FIGS. 4 to 9). Switches 187 to 192 are actuated through balls B by rods 113, 116, 184 and 141 moved vertically by rod 104, core 109, rod 132 and nut 130 respectively, whereas switches 185, 194 and 195 are controlled by a shoe 186 moving together with piston 121 and shown in FIG. 4 in three different positions opposite contactors 185, 194 and 195.

For obvious safety reasons all the contactors are double switches i.e. produce the opening of a first contact provided in a first control circuit and the closing of a second contact (disposed in a second control circuit) under the action of a ball B or of shoe 186. Thus when operating bar 45, together with control rod 43, arrive into upper position, this is detected by switch 185 (FIG. 4) actuated by shoe 186 which is movable together with piston 121 whereas the coming of pieces 45 and 43 into the lower position is detected by switch 187 (FIGS. 4 and 5) actuated by rod 113, the coming into lower position being transmitted to rack 62 through differential 41 as above described. Resetting of spring 61 after an expansion of said spring (which is also effected through the intermediate of differential 41 when lifting control rod 43 from its lower position) is checked by switch controlled by the head 113 of rod 114.

Switch 189, controlled by rod 116 bearing upon core 109, is disposed at the upper part of actuating device 60, the operation of this switch having for its effect to bring into action an economizer (not shown) for electro-magnet 111 after checking the closing of hooking links 106.

As for the contactors which detect the position of tong 46 they are housed in the upper part of the shock absorbing device 117 and they comprise the following elements:

Double contactors 190 and 191 controlling the closing of tong 46, respectively without the control rod being present and in position around the control rod 43, these contactors being actuated by rod 184, Double contactor 192 which determines the power torque at the end of the opening and closing movement of tong 46 and which is controlled by the notch 193 in sleeve 141.

The double contactor 194 actuated by shoe 186 permits of automatically producing the opening of tong 46 when it moves down in the absence of the rod, whereas the double contactor 195, also actuated by shoe 186, produces the stopping of the disengagement stroke in the upward direction of the operating bar when it is necessary to produce rotation of the small rotating plug 30.

Operation

The operation of the device is as follow:

(a) *Normal displacement of the control rod.*—During the normal operation of the nuclear reactor the displacement of a control rod 43 is produced by electric motors 66 and 67, the pinion 92 of differential 77 and the ring gear 57 of differential 41 being held in fixed position.

When it is necessary to move down a control rod 43, motor 66 is fed with current so that its shaft 78 turns in a direction such that the rotations of motors 66 and 67, combined in differential 70, cause the output shaft 71 of this differential to turn in a given direction, which produces (through gears 73, 74, 75, differential 77, gears 51, 52, 53, 54, 55, 56 and differential 41) a rotation of shaft 48 in the direction producing a downward movement of rack 44 and of operating bar 45, together with control rod 43, at a medium speed of for instance 1 mm./s.

In a likewise manner, in order to move a control rod 43 upwardly, reversible motor 66 is fed with current in such manner that its shaft turns in a direction opposed to the preceding one. Differential 70 combines the rotations of motors 66 and 67 in opposed directions and shaft 71 turns in a direction opposed to that above referred to and at a slower speed, which produces, through the same gears as above mentioned, a rotation of shaft 48 in a direction such that rack 44, bar 45 and control rod 43 are moved upwardly at a slow speed, of 0.1 mm./s. for instance.

At the same time as it moves rack 44, the ring gear 42 of differential 41 rotates, through gears 87a and 88a, toothed wheels 89a and 93a, the first of which operates, through transmission 90a and toothed wheel 91a, the coarse adjustment selsyn transmitter 96a and the second of which operates, through transmission 92a and pinion 94a, the fine adjustment selsyn transmitter 95a. Owing to a synchronous transmission through conductors 98 and 99, it is possible to follow, in the control chamber, the displacements of operating bar 45 and of control rod 43.

When, under the effect of a manual or automatical control, a control rod 43, together with its operating bar 45, has reached its upper limit position, shoe 186, fixed on the piston 121 of the operating bar, acts upon double contactor 185 to stop the feed of current to motors 66 and 67 and this to stop rod 43 in its upper limit position. On the contrary, the lower limit position does not risk to be reached during the normal displacement of operating bar 45 and control rod 43.

In case of breakdown of motors 66 and 67, it is possible to rotate shaft 48 in the desired direction (through clutch 89 and gears 91, 93, 51, 52, 53, 54, 55 and 56) by means of crank 87 and consequently to move control rod 43 upwardly and downwardly. Mechanical abutments (not shown) then limit the displacements of the control rod in the upward and in the downward directions, contact with the abutment having for its effects to prevent further rotation of crank 87 due to the effect of torque limiter 94.

(b) *Quick downward displacement of the control rod in case of emergency.*—In case of emergency safety devices (not shown) cut off a current feed to electro magnet 111, so that core 109 is released. When core 109 is thus released, it moves upwardly under the action of spring 110. Wedge 108, carried by this core, ceases to keep rollers 106b away from one another. Links 106 pivot about their respective axes 107 from the position of FIG. 6 to that of FIG. 5 and release the head 105 of rod 104. Under the sudden action of springs 61 which expand, plate 103, together with rack 62, is moved quickly in the downward direction, causing gears 63, 64, 65 and 59 to rotate. This produces a quick rotation of the gear ring 57 of differential 41 and consequently the downward displacement of bar 45 and control rod 43 at a very high speed. The strength of springs 61 is calculated so that the total downward displacement takes place in less than one second (for instance in 0.4 or 0.5 second) starting from the time of the release order i.e. from the stopping of the feed of current to electro-magnet 111.

It will be noted that, if an adjustment movement is taking place when the safety release order arrives, the rotation imparted to gear ring 42 and therefore to rack 44 from shaft 48 is of an order of magnitude entirely different from that of the rotation imparted to gear ring 42 through planet-wheel carrier 49b from gear ring 57 (which ensures the safety operation). As a matter of fact, for instance, during the total time of a downward movement of the control rod by the safety means, i.e. 0.4 second, the operation at the medium speed of 1 mm./s. produces a displacement of 0.4 mm. of rack 44. As a matter of fact whether an adjustment operation is taking place or not, when rack 62 is released, shaft 48 can be considered as a practically fixed element.

On the other hand the force which springs 61 are acting, and consequently the cycle of the speeds at the beginning of a safety operation of bar 45 and rod 43 in the downward direction, are independent of the initial position of this rod, because the springs always act in the same manner upon ring gear 57, the action of which upon rack 44 is independent of the position of said rack.

At the end of the downward stroke, frusto-conical rings 125 and 126, under the pressure of the gas compressed by piston 124, and washers 128 and 129 reduce the speed of movement, then absorb the shock at the end of the stroke, thus preventing oscillations of bar 45 which carries control rod 43.

After detection and elimination of the cause which has produced the action of springs 61, it is necessary to reset these springs i.e. to compress them. For this purpose, piston 121 bearing against the end of cylinder 118, motors 66 and 67 are started, the first one turning in the direction corresponding to downward movement of the control rod, which produces through differentials 70, 77 and 41, the rotation of sleeve 58 in a direction such that, through gears 59, 65, 64 and 63, rack 62 is moved upwardly and compresses springs 61 until the head 105 of rod 104 (coupled with rack 62) actuates, through rod 114 the following elements:

Contactor 187 which stops motors 66 and 67 and which supplies electro-magnet 111 with current, thus locking links 106 of holding head 105 while pulling core 109 downwardly against the action of spring 110, and Contactor 188 which signals the hooking of head 105 and releases electric safety means (not shown preventing upward movement of rod 43 as long as springs 61 are not compressed and head 105 hooked in position.

(c) *Hooking and release of the control rod.*—Hooking and release of control rod 43, normally supported by tong 46 which is carried by operating bar 45, are ensured by means of motor 135 through speed reducing gears 136, 137, 138, 139, or in case of breakdown of the motors by means of crank 145 which rotates pinion 147. In both cases this movement of rotation is imparted to pinion 140 and therefore to nut 130, which produces a translatory displacement of screw 131 and consequently of rod 132, 132a, 132b.

It will be noted that when the control rod is located in the active portion of the reactor it is subject to a high temperature and therefore undergoes an important expansion (for instance of several centimeters). As a consequence, the position of the head 47 of rod 43, when said rod rests upon its seat 183 carried by tubes 179 and 180 fixed in plate 5 (FIG. 11e) is different according to the position of the rod. We may distinguish two kinds of operation:

Cold conditions operation (temperature ranging approximately from 150 to 350° C.), Hot conditions operation (temperature ranging approximately from 350 to 550° C.), In FIGS. 13, 14, 15 we have illustrated the successive positions of the branches 134 of tong 46 and of rod 43 during a hooking operation taking place under cold operation conditions. FIG. 13 shows the position of head 47 when the cold rod is resting upon its seat. On the contrary FIGS. 16, 17 and 18 represent the successive positions of the branches 134 of tong 46 and of rod 43 during a hooking operation taking place under hot working conditions, FIG. 16 shows the position of head 47 when the hot rod is resting upon its seat.

In both cases, tong 46 being closed without the rod being held by it (FIGS. 13 and 16), shoe 186 acts upon double contactor 195 (FIG. 4) and tong opening operation can take place normally. It is performed in two steps, under the effect of the rotation of pinion 140 which moves the head 133 of tong 46 in the downward direction.

The first step consists in a downward translation movement (without opening) of branches 134 guided by central core 173 and guiding ring 172.

The second step produces the opening of branches 134 by the same downward translatory movement of head 133 at the end of its stroke.

The tong being opened, downward movement of head 133 is pursued until said head reaches its lower limit position (FIGS. 14 and 17) wherein ring 172 is housed in the notches 174 of branches 134.

During the closing of tong 46 (by rotation of motor 135 or of crank 145 in the opposite direction) branches 134 are closed and the head 47 of rod 43 is inserted in the end 171, rod 43 being thus lifted out of sheath 181 until the hooking position is reached (FIGS. 15 and 18). In this position head 47 comes into a housing 173a provided for this purpose in cone 173. Then control rod 43 receives the translatory displacement of operating bar 45. It will be noted that the heights to which head 47 is lifted from sheath 181 when the hooking operation is finished are different according as the rod is cold (FIG. 15) or it is hot (FIG. 18).

When tong 46 is closed on rod 43, double contactor 191 is actuated by rod 184 to indicate such a closing and to release an electric safety device (not shown) which prevented upward movement of rod 43 and bar 45. As a matter of fact, there remains an electric safety device preventing upward movement of rod 43 and bar 45, this safety device being that which is released when springs 61 are reset.

On the contrary when the tong is closed without the rod being present (position of FIGS. 13 and 16) double contactor 190 is actuated by rod 184 because the whole of rods 132, 132a, 132b is lifted to a slightly higher level into tong closing position due to the fact that the upper limit position of branches 134 in tube 150a is slightly higher when these branches close without the rod being present than when they close on the rod (compare FIGS. 13 and 15, and also 16 and 18).

Release of the control rod is obtained in a similar manner but the order of the operations is reversed. Release takes place in two steps:

In the first step there is an upward vertical displacement of branches 134 (which were initially in the position of FIG. 15 or 18, according to the temperature of the rod) without opening, until control rod 43 comes to bear upon its seat 183;

During the second step, branches 134 open when the tong further moves down after rod 43 has come to rest upon its seat (position of FIG. 14 or 17).

In the case of operation in cold conditions, the opening of the tong takes place without special precaution in the low position. On the contrary, in the case of operation under hot conditions the opening of branches 134 is automatically produced in a position a little higher than the low position by a contactor (not shown). Owing to this automatic opening the hot rod is placed upon its seat in the same conditions as when it is cold.

In both cases, release of the rod is checked by lifting the tong and closing it. The different height of closing, according as the rod is still hooked or not (FIG. 15 or 13 for cold conditions or FIG. 18 or 16 for hot conditions) is indicated by double contactors 191 or 190 as above described.

(d) *Disengagement of the control rod.*—The essential purpose of the release of the rod (which requires a subsequent new hooking) is to permit disengagement of operating bar 45 above assemblies 2, in order to permit rotation of plugs 25 and 30 for loading and unloading of fuel assemblies 2.

The disengagement operation comprises the following steps:

Release of springs 61 by cutting off the feed of electromagnet 111 in order to prevent an uncalled for release thereof by lack of current, Uncoupling of control rod 43 by feeding current to motor 135 or by operating crank 145 as above indicated, and Upward displacement of operating bar 45 (without rod 43) by means of motors 66 and 67 or of crank 87, and this into a position where it does not risk of coming into contact with the upper ends of fuel assemblies 2 during the rotation of plugs 25 and 30, double contactor 195 being disposed so as to be actuated by shoe 186 (FIG. 4) when the bar reaches this position; it may for instance switch on a lamp which warns the operator that he can stop the upward movement of bar 45;

In this upper position, operating bar 45 is kept in position by the irreversibility of differential 41: furthermore, for reasons of safety, brakes 68 and 69 further contribute in keeping the bar in this position.

*Advantages of the Device According to This Invention*

It is possible to bring very quickly (in a fraction of a second) a control bar into its safety position, and this even if this bar is being displaced for adjustment.

The force with which a control bar is moved down into safety posiiton is independent of the position of this bar when an emergency occurs.

Every control rod can be detached from the operating bar which supports it so as to permit disengagement thereof, in particular to permit loading and unloading of the fuel assemblies.

The mechanism for hooking and releasing the control rod with respect to the operating bar work automatically whatever be the temperature of the rod.

The regulating displacement of a control rod and the operations for detecting and securing it, may be effected either by means of electric motors or by means of hand cranks. In case of emergency, the control of the device does not depend upon the inclination of the control rod so that it can be used on board a ship.

The automatic control means and the emergency control means are independent of each other as far as the differential gear which actuates the control rod.

Locking means are provided to prevent the control rod from being withdrawn from its safety position as long as the actuating mechanism has not been reset.

The power unit for producing the normal displacement of the control rod (shown at 50 in FIG. 3) is removable and may be replaced by a single speed gear box for operation of the reactor in order to start it.

In a general manner while we have, in the above description, disclosed what we deem to be a practical and efficient embodiment of our invention, we do not wish to be limited thereto as there might be changes made in the arrangement, disposition and form of the parts without departing from the principle of our invention as comprehended within the scope of the appended claims.

What we claim is:

1. In a nuclear reactor, in combination, a movable control rod adapted to occupy a safety position in said reactor and a device for operating said control rod, said device comprising a differential gear having an output element a first rotating input element, and a second rotating input element, means for operatively connecting said output element with said control rod, a power system operatively connected with said first input element in either of two opposed directions, and an actuating mechanism operatively connected with said second input element to drive it in the direction producing the movement of said control rod into safety position.

2. A combination according to claim 1 wherein said output element is a ring gear, said means comprising an operating bar adapted to support said control rod and a rack fixed with respect to said operating bar and in mesh with said ring gear.

3. A combination according to claim 1 wherein said power unit comprises, a second differential gear having two input shafts and an output shaft, a first electric motor with a single direction of rotation, transmission means between said first motor and one of said input shafts, a second electric motor, of the reversible type, transmission means between said second motor and the other of said input shafts, said motors and said transmission means being adapted to rotate said two shafts at different respective speeds, a third differential gear, having two input shafts and one output shaft, said second differential gear output shaft being operatively connected with one of said third differential gear input shafts, manual driving means operatively connected with the other of said third differential gear input shafts, and means for operatively connecting said third differential gear output shaft with said first input element of said first differential.

4. A combination according to claim 1 wherein said actuating mechanism includes a normally stressed spring and means for automatically releasing said spring in case of emergency.

5. In a nuclear reactor, in combination, a movable control rod adapted to occupy a safety position in said reactor and a device for operating said control rod, said device comprising a differential gear having an output element a first rotating input element and a second rotating input element, means for operatively connecting said output element with said control rod, a power system operatively connected with said first input element in either of two opposed directions, and an actuating mechanism operatively connected with said second input element to drive it in the direction producing the movement of said control rod into safety position, said actuating mechanism comprising a rod operatively connected with said second input element for driving it, a normally stressed spring having a fixed end and a movable end, said movable end being operatively connected with said last mentioned rod so that when said spring is released it moves said last mentioned rod to drive said second input element in the direction producing the movement of said control rod into safety position, an electro-magnet device adapted, when fed with current, to hold said spring in stressed condition, but to release it when not fed with current, and emergency responsive means for cutting off the feel of current to said electro-magnet device.

6. A combination according to claim 1 further comprising a fixed cylinder, a piston, slidable in said cylinder, operatively connected with said rod of the actuating mechanism, so that said piston is driven by said last mentioned rod, means in said cylinder for reducing to a value little different from zero the speed of movement of said piston when said control rod is nearing its safety position, and means for damping the end of the displacement of said rod of the actuating mechanism.

7. A combination according to claim 1 comprising an operating bar operatively connected with said differential output element, a tong carried by one end of said operating bar and adapted to hold said control rod releasably, and fixed guiding means capable of cooperating with said operating bar for opening or closing said tong in response to movements of said bar.

8. A combination according to claim 7 further comprising a system, comprising two elements, respectively a nut and a screw, for producing a translatory movement of one of said last mentioned elements, called sliding element, in response to a rotation of the other of said elements, called rotating element, said sliding element being operatively connected to said operating bar to move it longitudinally, a motor operatively connected with said rotating element for driving it, and manual means operatively connected with said rotating element for driving it in case of breakdown of said motor.

No references cited.